United States Patent
Chaudhary et al.

(10) Patent No.: US 9,473,368 B1
(45) Date of Patent: Oct. 18, 2016

(54) NETWORK GRAPH REPRESENTATION OF PHYSICALLY CONNECTED NETWORK

(71) Applicant: International Business Machines Corporation, Armonk, NY (US)

(72) Inventors: Harsh Chaudhary, Briarcliff Manor, NY (US); Younghun Kim, White Plains, NY (US); Tarun Kumar, Mohegan Lake, NY (US); Abhishek Raman, Santa Clara, CA (US); Rui Zhang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/009,291

(22) Filed: Jan. 28, 2016

(51) Int. Cl.
*G06F 15/173* (2006.01)
*H04L 12/26* (2006.01)

(52) U.S. Cl.
CPC .............. *H04L 43/045* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 6,768,959 B2 | 7/2004 | Ignagni | |
| 7,466,654 B1* | 12/2008 | Reifer | H04L 63/1408 370/235 |
| 7,841,249 B2 | 11/2010 | Tormoen | |
| 8,076,928 B2 | 12/2011 | Nunally | |
| 8,341,106 B1 | 12/2012 | Scolnicov et al. | |
| 2002/0161885 A1* | 10/2002 | Childers | H04L 69/329 709/224 |
| 2015/0145688 A1 | 5/2015 | Graff | |
| 2016/0105350 A1* | 4/2016 | Greifeneder | H04L 43/12 709/224 |

OTHER PUBLICATIONS

List of IBM Patents or Patent Applications Treated as Related; (Appendix P), Filed Apr. 8, 2016; 2 pages.
Harsh Chaudhary et al., "Topological Connectivity and Relative Distances From Temporal Sensor Measurements of Physical Delivery System", U.S. Appl. No. 14/976,820, filed Dec. 21, 2015.
Harsh Chaudhary et al., "Linepack Delay Measurement in Fluid Delivery Pipeline", U.S. Appl. No. 14/976,870, filed Dec. 21, 2015.
Tarun Kumar et al., "Detecting Small Leaks in Pipeline Network", U.S. Appl. No. 14/976,960, filed Dec. 21, 2015.

(Continued)

*Primary Examiner* — Brian P Whipple
(74) *Attorney, Agent, or Firm* — Cantor Colburn LLP; David Quinn

(57) ABSTRACT

A method and system to generate a network graph representation of a physically connected network include selecting a selected sensor among a plurality of sensors arranged along the physically connected network, searching a time-varying data signal from the selected sensor for measurement patterns; identifying candidate sensors among the plurality of sensors that are candidates for being directly connected with the selected sensor based on each of the candidate sensors outputting a respective candidate time-varying data signal with candidate patterns that match the measurement patterns of the time-varying data signal, and constructing possible graph sub-structures including the selected sensor and the candidate sensors. Determining a feasible graph sub-structure is based on the possible graph sub-structure and spatial placement of each of the selected sensor and the candidate sensors, and generating the network graph representation is by iteratively determining the feasible graph sub-structure by selecting a different sensor as the selected sensor.

20 Claims, 11 Drawing Sheets

(56) References Cited

OTHER PUBLICATIONS

Beck et al., "Pipeline Network Features and Leak Detection by Cross-Correlation Analysis of Reflected Waves", Journal of Hydraulic Engineering, vol. 131, No. 8, pp. 1-30, 2005.
Hwang et al., "Characterization of gas pipeline inspection signals using wavelet basis function neural networks", NDT&E International 33, 2000, pp. 531-545.
Phillips et al., "Mapping urban pipeline leaks: Methane leaks across Boston", Environmental Pollution, 173, 2013, pp. 1-4.
Rinaldi et al., "Identifying, Understanding, and Analyzing: Critical Infrastructure Interdependencies", IEEE Control System Magazine, Dec. 2001, pp. 1-15.
Shimizu et al., "Development of Realtime Disaster Mitigation System for Urban Gas Supply Network", 13th World conference on Earthquake Engineering, Aug. 1-6, 2004, pp. 1-12.
Shin, Dongil Peter "Monitoring, Detection and Diagnosis of Leaks from Gas Pipes Based on Real-Time Data Collected Over the Ubiquitous Sensor Network", Proceedings of 2008 AIChE Annual Meeting, 2008, pp. 1-2.
Wan et al., "Hierarchival Leak Detection and Localization Method in Natural Gas Pipeline Monitoring Sensor Networks", Sensors, 2012, pp. 1-26.
List of IBM Patents or Patent Applications Treated as Related; (Appendix P), Filed Jan. 28, 2016; 2 pages.
Harsh Chaudhary et al., "Temporal Delay Determination for Calibration of Distributed Sensors in A Mass Transport Network", U.S. Appl. No. 15/009,262, filed Jan. 28, 2016.
Harsh Chaudhary et al., "Leak Localization in Pipeline Network", U.S. Appl. No. 15/009,321, filed Jan. 28, 2016.
Harsh Chaudhary et al., "Leak Identification in a Mass Transport Network", U.S. Appl. No. 15/009,340, filed Jan. 28, 2016.
Harsh Chaudhary et al., "Forecasting Leaks in Pipeline Network", U.S. Appl. No. 14/976,903, filed Dec. 21, 2015.

\* cited by examiner

NETWORK GRAPH REPRESENTATION OF PHYSICALLY CONNECTED NETWORK

BACKGROUND

The present invention relates to network connectivity determination, and more specifically, to network graph representation of a physically connected network.

Pipeline networks that transport water, natural gas, or other resources can traverse hundreds of miles at or above the surface. Sensors and other equipment may be located at regular or irregular intervals of the network (e.g., every 30-100 miles). In the exemplary case of a gas pipeline, the sensors may include a pressure sensor, and the equipment may include a compression station that increases pressure to push the gas along the pipeline (toward the next compression station). The equipment would additionally include communication equipment to transmit the sensor information. A supervisory control and data acquisition (SCADA) system obtains data from and provides control to the remote sensors and equipment. In order to analyze the obtained data, the operator and algorithms need to know the physical and logical connections among the measurement points. That is, the network structure representing the SCADA measurement points needs to be known.

SUMMARY

Embodiments include a method, system, and computer program product for generating a network graph representation of a physically connected network. Aspects include selecting a selected sensor among a plurality of sensors arranged along the physically connected network; searching a time-varying data signal from the selected sensor for measurement patterns; identifying candidate sensors among the plurality of sensors that are candidates for being directly connected with the selected sensor based on each of the candidate sensors outputting a respective candidate time-varying data signal with candidate patterns that match the measurement patterns of the time-varying data signal of the selected sensor; constructing possible graph sub-structures including the selected sensor and the candidate sensors; determining a feasible graph sub-structure based on the possible graph sub-structure and spatial placement of each of the selected sensor and the candidate sensors; and generating the network graph representation based on iteratively determining the feasible graph sub-structure based on selecting a different one of the plurality of sensors as the selected sensor.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, the connectivity among the measurement points (sensor locations) may not be known for a network. The geopositioning of the sensors themselves is known, but their interconnectivity (e.g., which pipe segment connects to which other pipe segment) is not necessarily known or current. That is, while the initial network structure may be known and recorded in an enterprise asset registry and a new operator may be trained regarding the structure, changes in configuration may occur over time. Further, the enterprise asset registry does not capture the logical graph structure of the connected sensors. As a result, advanced analytical capabilities stemming from graph theory cannot be applied. Without a clear understanding of the network connections, analysis and decision-making can provide unexpected results. Embodiments of the systems and methods detailed herein relate to constructing a network graph representation of the physically connected network by determining the interconnections. While a gas pipeline is discussed for explanatory purposes, the embodiments discussed herein apply, as well, to other networks and to other pipelines that transport other resources.

Figure 1:
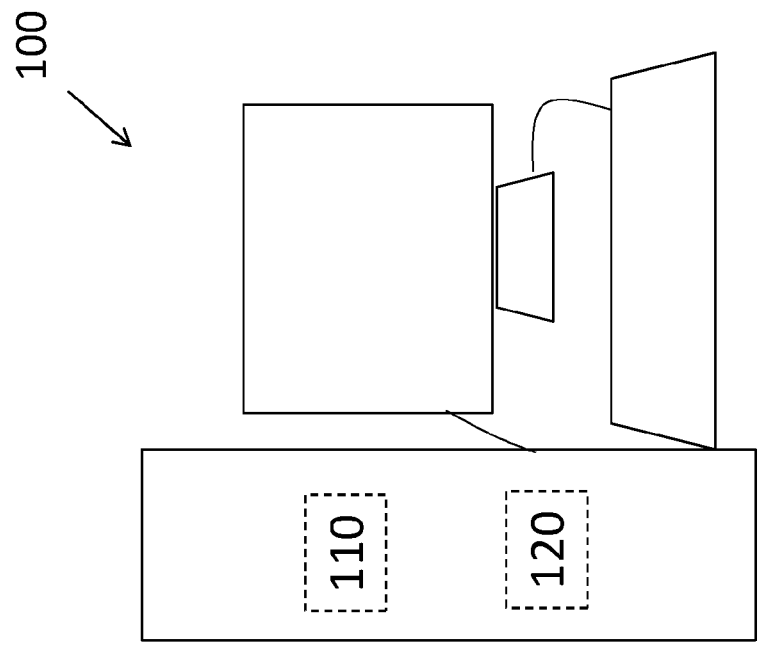
FIG. 1 is a block diagram of a system that generates a network graph representation of a physically connected network according to embodiments.
Figure 1:
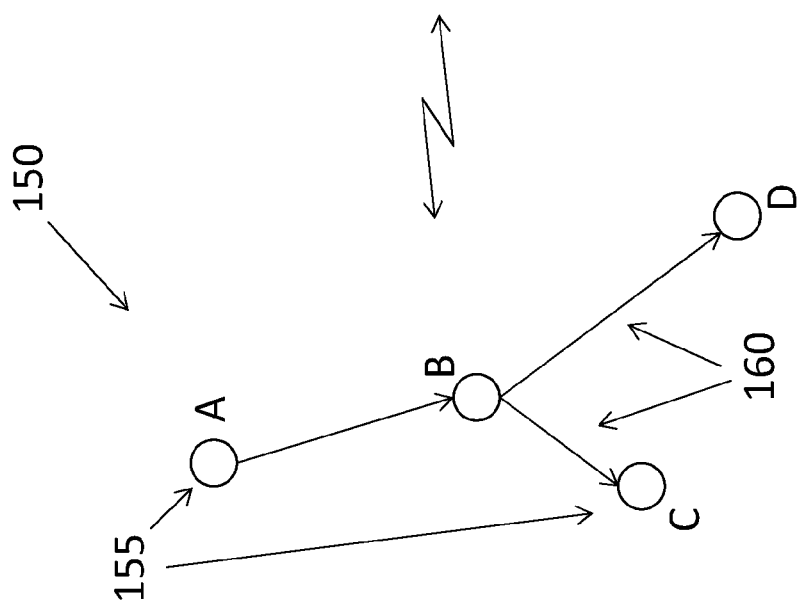

FIG. 1 is a block diagram of a system 100 that generates a network graph representation of a physically connected network 150 according to embodiments of the invention. The system 100 may also serve the SCADA function or may be separate from the SCADA system that controls the physically connected network 150. The physically connected network 150 (e.g., gas pipeline) includes sensors 155 at known locations based on geopositioning. The physically connected network 150 also includes interconnections 160 that the system 100 must determine in order to generate the network graph representation. The exemplary physically connected network 150 in FIG. 1 includes exemplary sensors 155 A, B, C, and D. The system 100 includes one or more memory devices 110 and one or more processors 120. The system 100 includes additional known components that perform functions such as, for example, communication with the sensors 155 of the physically connected network 150. The memory device 110 stores instructions implemented by the processor 120 to generate the network graph representation according to the embodiments detailed below. According to the embodiments detailed below, the memory device 110 may additionally store a local copy of the asset registry or the system 100 may access the asset registry via wireless or wired communication.

Figure 2:
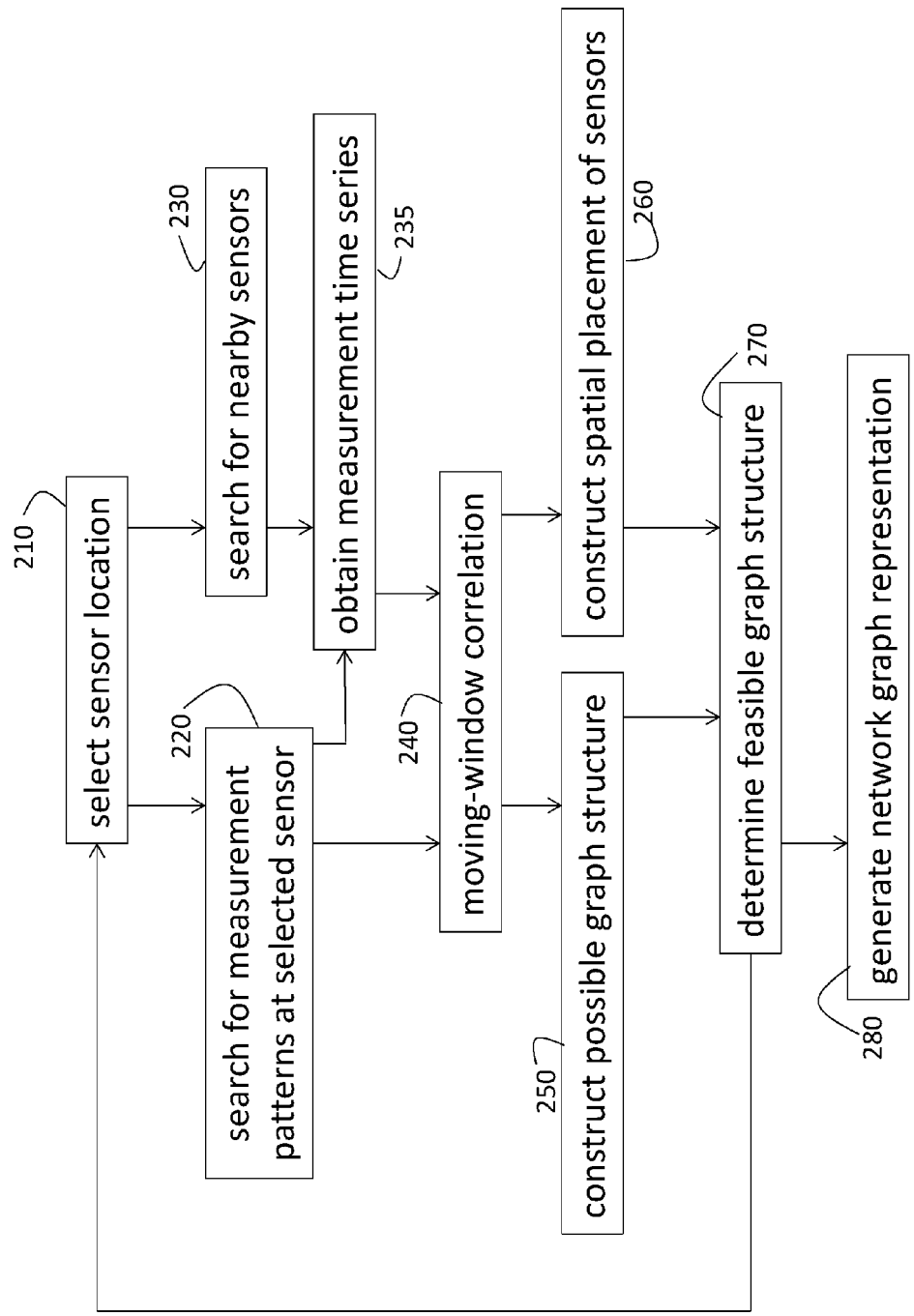
FIG. 2 is a process flow of a method of generating a network graph representation of a physically connected network according to embodiments.

FIG. 2 is a process flow of a method of generating a network graph representation of a physically connected network 150 according to embodiments. The method described with reference to FIG. 2 is based on the fact that a change in the time-varying data signal that is initiated within the physically connected network 150 will be detected at a downstream sensor 155 at a time that is commensurate with the distance of the downstream sensor from the point of initiation. For example, in a natural gas pipeline, the pressure increase induced by a compression station within the physically connected network 150 travels downstream along the physically connected network 150. This pressure increase will be detected by pressure sensors 155 of the physically connected network 150 at different times based on the distance of each sensor 155 from the compression station. A pressure decrease at some point within the physically connected network 150 would similarly be detected downstream. The method described with reference to FIG. 2 may be regarded as a passive method, because the network graph representation is generated based on passive observations of the existing operation and state of the physically connected network 150. For explanatory purposes, the physically connected network 150 shown in FIG. 1 with sensors 155 A, B, C, and D will be referenced. To be clear, the physical connections (interconnections 160) shown in FIG. 1 are not known and are determined according to the embodiments detailed below. Thus, the processor 120 can obtain the geoposition of the sensors 155 and can determine that sensor 155 A might be connected to sensor 155 B or sensor 155 C based on their positions but cannot know whether there is an interconnection between sensor 155 A and sensor 155 B or between sensor 155 A and sensor 155 C. The exemplary physically connected network 150 referenced for explanatory purposes is a natural gas pipeline such that the exemplary time-varying data signal is a time-varying pressure signal (i.e., the sensors 155 are pressure sensors). However, the time-varying data signal may differ based on the specific physically connected network 150 that is being represented. For example, when the physically connected network 150 transports water, the time-varying data signal may be a time-varying flow rate signal (i.e., the sensors 155 measure flow rate of the water).

At block 210, the processes include selecting a sensor location. In the exemplary natural gas network shown in FIG. 1, the process at block 210 may include selecting a location of the sensor 155 A. At block 220, searching for measurement patterns includes looking for transient changes in the time-varying data signal measured at the selected sensor 155 (e.g., the pressure measurements from sensor 155 A in the example). That is, the measurement of pressure at sensor 155 A for some period of time (e.g., the last two days) is examined to record a start time of a pressure increase and a measurement series that includes the measurement patterns. This process is further discussed below. At block 230, searching for nearby sensors 155 includes creating an ordered list of sensors 155 that are near the sensor that was selected at block 210 based on their geopositions. The exemplary ordered list associated with the physically connected network 150 in FIG. 1 (with sensor 155 A as the selected sensor) would include sensor 155 B followed by sensor 155 C and then sensor 155 D. A predefined threshold distance (e.g., 60 miles) or number of sensors 155 (e.g., the two nearest sensors 155) may be used to determine which sensors 155 are considered nearby sensors. In the exemplary case shown in FIG. 1, based on a threshold distance or a threshold number of the closest sensors 155, sensors 155 B and C may be considered nearby sensors. Obtaining measurement time series at block 235 is for the nearby sensors 155 (B and C in the example). The connection between blocks 220 and 235 indicates that the measurement time series obtained for the nearby sensors 155 (at block 235) is related to the start time determined as part of the processing at block 220. That is, the time series obtained at block 235 is the time-varying data signal at each of the nearby sensors 155 for some period of time around the start time. In the exemplary case, the time series is the pressure measurement from sensors 155 B and C for several hours to a day starting from the start time determined at block 220. As noted above, a pressure increase initiated at a compression station would reach sensor 155 A before it would reach whichever sensor 155 is downstream of sensor 155 A. Thus, time series from each sensor 155 (sensors 155 B and C) nearby to the selected sensor 155 (sensor 155 A) are of interest.

At block 240, performing a moving-window correlation generally refers to looking for the pressure increase (in the case of the exemplary gas network) in the nearby sensors that corresponds with the pressure increase in the selected sensor. This process includes correlating the measurement time series (obtained at block 235) with the recorded measurement series (at block 220) or a template identified based on the recorded measurement series. That is, the correlation may not be with the measurement series obtained for the selected sensor 155 (at block 220) but, instead, with a template time series (i.e., a cleaner pressure series pattern than the one received from the selected sensor 155) that corresponds with the measurement series from the selected sensor 155. This correlation is further discussed below.

At block 250, constructing a possible graph structure includes using the result of the correlation at block 240 to make possible interconnections 160. In the example relating to FIG. 1, if both of the measurement time series obtained at block 235 (for sensors 155 B and C) correlate with the measurement series obtained at block 220 (or a corresponding template time series), then the possible graph structure constructed at block 250 includes interconnections 160 from sensor 155 A to sensor 155 B and from sensor 155 A to sensor 155 C. At block 260, constructing a spatial placement of sensors includes mapping the geolocations of each of the sensors 155. Determining a feasible graph structure, at block 270, is based on considering the possible graph structure (constructed at block 250) in view of the spatial placement of the sensors 155 (constructed at block 260), as further discussed below. Generating the network graph representation, at block 280, is based on estimating the interconnections 160 according to the processes described above and is based on iteratively repeating the processes (at blocks 210 through 270) with different sensors 155 of the network being selected as the selected sensor 155 at block 210. A portion or all of the physically connected network 150 may be graphed according to the processes shown in FIG. 2.

Figure 3:
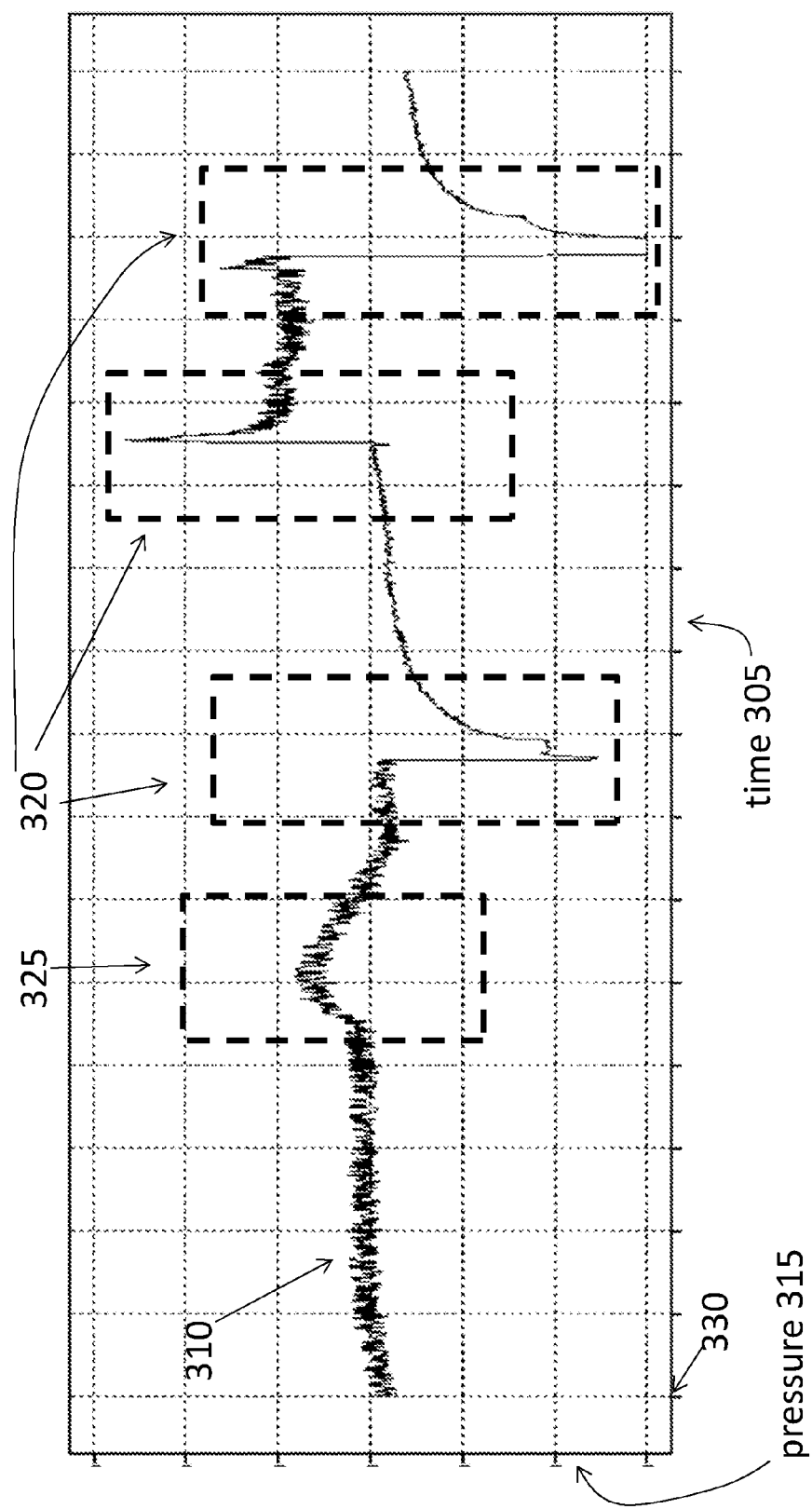
FIG. 3 shows an exemplary measurement series that includes measurement patterns recorded from a time-varying data signal according to an embodiment.
Figure 4:
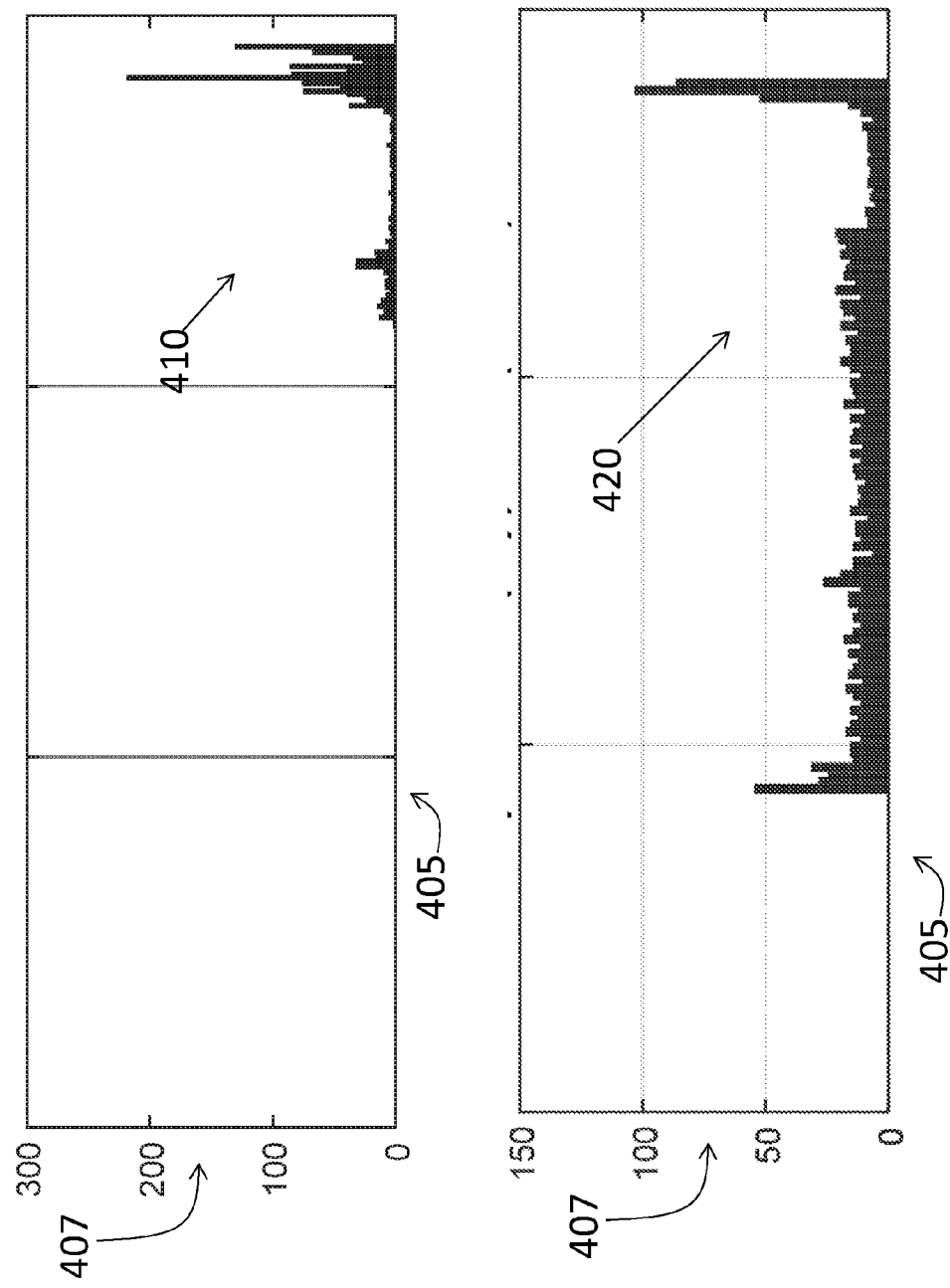
FIG. 4 shows histograms used to detect a measurement pattern according to an embodiment.

FIGS. 3 and 4 illustrate the process of searching for the measurement patterns to record the measurement series at block 220, according to embodiments. FIG. 3 shows an exemplary measurement series 310 that includes measurement patterns 320 recorded from a time-varying data signal according to an embodiment. According to the example, the time-varying data signal is a time-varying pressure signal. Time is indicated along axis 305 and pressure is indicated along axis 315. The time varying pressure signal is searched for measurement patterns 320 to identify the measurement series 310 of interest. An exemplary way to define a measurement pattern 320 is given by EQ. 1 and EQ. 2 below:

$$\max(d(t)) - \min(d(t)) \geq \text{sensor\_dynamic\_range} \quad [\text{EQ. 1}]$$

$$\text{var}(d(t)) \geq \alpha \quad [\text{EQ. 2}]$$

A search for a measurement pattern 320 may be conducted by examining a subset of the time-varying data signal in a sliding-window fashion. In the equations, d(t) refers to the data values of the time-varying data signal that are searched (i.e., that are in the window), the sensor dynamic range is predefined for the sensor 155, and α is the variance of the sensor 155 in steady state. A different pattern 325 is identified for discussion with reference to FIG. 4 below. This pattern 325 may not qualify as one of the measurement patterns 320. The start time of the recorded measurement series 310 is indicated by 330. The identification of the measurement patterns 320 may be performed using a number of known techniques such as spectral analysis (e.g., analysis of the pressure spectrum as shown in FIG. 3), histogram analysis (as discussed with reference to FIG. 4), fast Fourier transform (FFT), and wavelet transformation.

FIG. 4 shows histograms used to detect a measurement pattern 320 according to an embodiment. FIG. 4 shows a histogram 410 of the pattern 325 and a histogram 420 of the first measurement pattern 320 shown in FIG. 3. Pressure values are indicated along axis 405, and the number of those pressure values is indicated along axis 407. As a comparison of histogram 410 with histogram 420 indicates, the pressure values within the pattern 325 (shown in histogram 410) fall within a smaller range than the pressure values within the first measurement pattern 320 (shown in histogram 420). A threshold value may be defined on the spread of pressure values, for example, such that the histogram of a subset of time-varying data values must exceed the threshold spread of pressure values in order to declare the presence of a measurement pattern 320.

Figure 5:
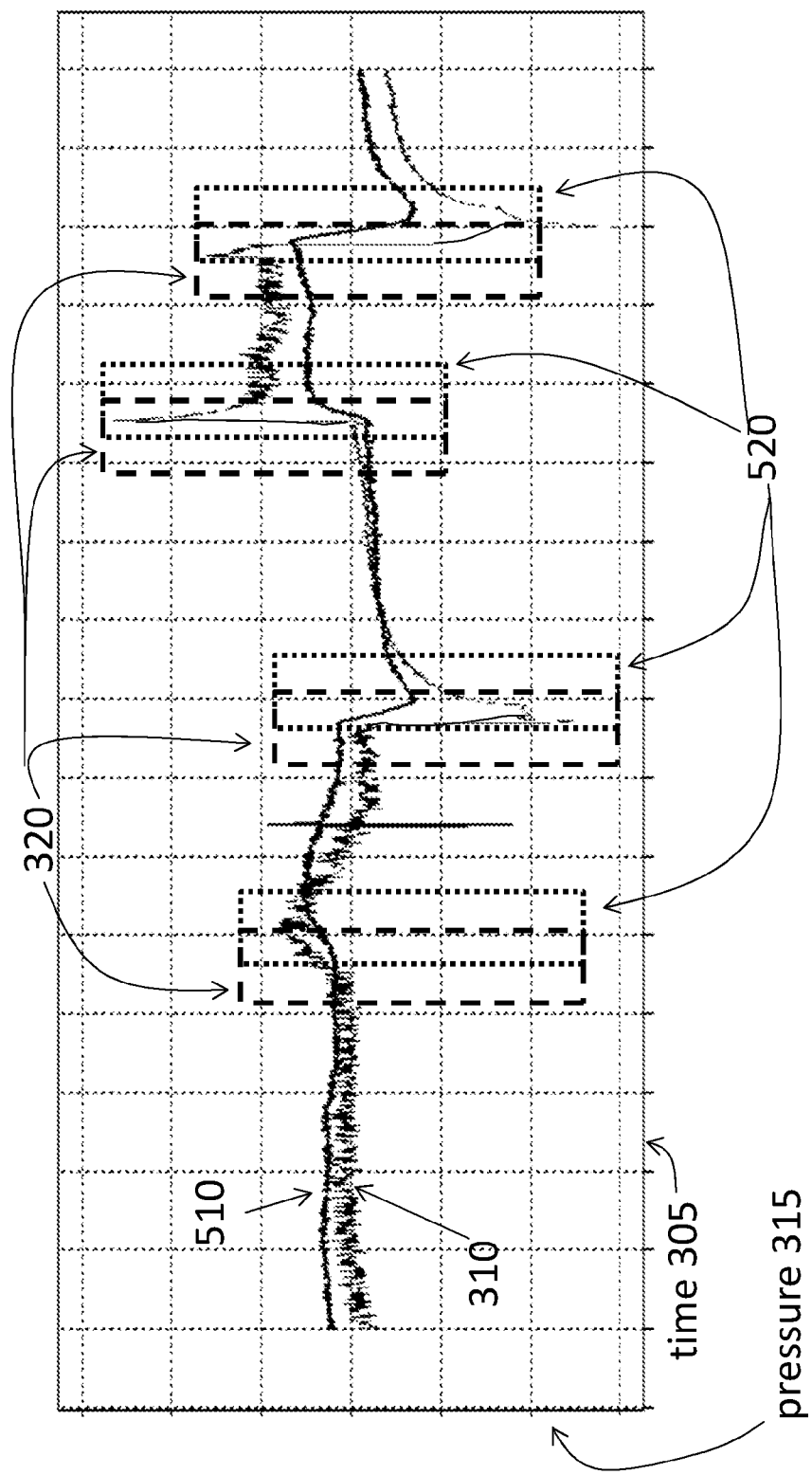
FIG. 5 illustrates an exemplary correlation according to an embodiment.

The moving-window correlation at block 240 includes pattern analysis that may be based on the same known techniques used to identify the measurement patterns 320 from the selected sensor (at block 220). That is, spectral analysis, histogram analysis, FFT, wavelet transformation, or a combination of one or more of these may be used to find a match between the measurement patterns 320 and the measurement time series from nearby sensors (obtained at block 235). FIG. 5 illustrates an exemplary correlation according to an embodiment. The measurement series 310 with the measurement patterns 320 is shown along with a measurement time series 510 obtained for a nearby sensor 155. In the exemplary case of the physically connected network 150 discussed above, the measurement series 310 may be based on sensor 155 A (the selected sensor 155) and the measurement time series 510 may be obtained from sensor 155 B or C (a nearby sensor 155). As FIG. 5 shows, the measurement time series 510 includes patterns 520 that match the measurement patterns 320 of the measurement series 310 but lag the measurement patterns 320 in time. This time lag is expected because the nearby sensors 155 (B and C) are downstream of the selected sensor 155 (A) such that a pressure change reaching sensor 155 A will reach sensors 155 B and C at a later time. However, this time lag alone does not provide all the information needed to determine whether the selected sensor 155 (A) is interconnected with the nearby sensor 155 (B or C), because there could be an intervening sensor 155. This is the case in the exemplary physically connected network 150. The measurement time series 510 obtained from sensor 155 C may include patterns 520 that match (and lag from) the measurement patterns 320. This is because a pressure change that reaches sensor 155 A will then reach sensor 155 B and then sensor 155 C. However, sensor 155 B is an intervening sensor 155 between sensor 155 A and sensor 155 C such that there is no interconnection 160 between sensor 155 A and sensor 155 C.

The match between patterns 320, 520 and the lag in the pattern 520 do indicate that the nearby sensor 155 is a candidate for a connected sensor 155.

Figure 6:
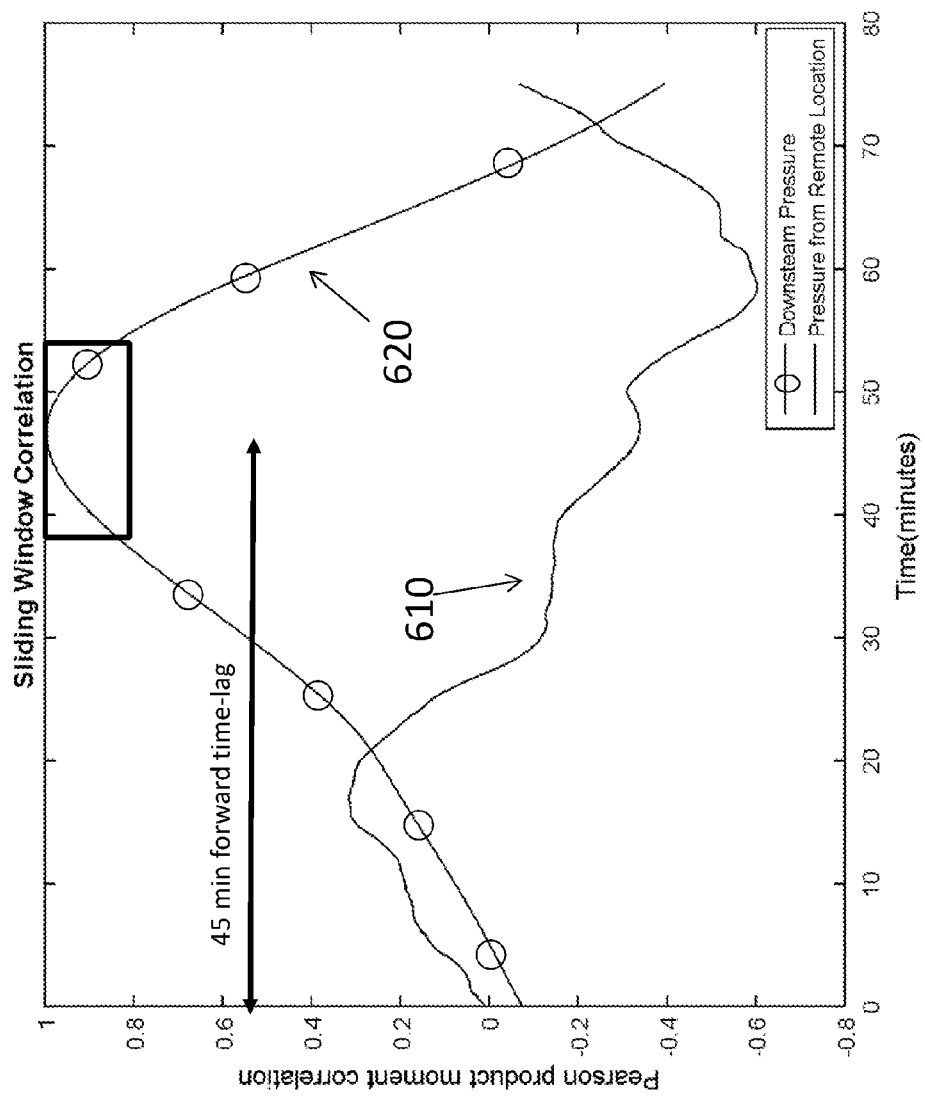
FIG. 6 illustrates an exemplary sliding window correlation according to an embodiment.

FIG. 6 illustrates an exemplary sliding window correlation according to an embodiment. Two correlation results 610, 620 are shown. The correlation result 610 is based on two disconnected sensors 155, and the correlation result 620 is between two connected sensors 155. Correlation may be determined for each nearby sensor 155 time series that includes patterns 520 that indicate the match as shown in FIG. 5 (i.e., a causality between the measurement patterns 320 of the selected sensor 155 and the patterns 520 of the nearby sensor 155). For example, a Granger causality analysis or correlation analysis may be performed. The Granger analysis is a known statistical hypothesis test for determining whether one time series (obtained from the selected sensor 155) is useful in forecasting another time series (of each nearby sensor 155). The exemplary correlation shown in FIG. 6 involves Pearson's correlation, and the Pearson's correlation coefficient is given by:

$$\rho_{X,Y} = \frac{\text{cov}(X, Y)}{\sigma_X \sigma_Y} \quad \text{[EQ. 3]}$$

In EQ. 3, X and Y are the two series 310, 510, cov is the covariance, and σ indicates standard deviation. A threshold Pearson's correlation coefficient value may have to be exceeded to determine that there is a correlation. In that case, a tuple may be created of (selected sensor 155, nearby sensor 155, correlation coefficient, time lag). The tuples generated at block 240 may be used to construct the possible graph structure at block 250. That is, all the nearby sensors 155 that have correlation coefficients higher than the threshold and, thus, a tuple, may be included in the possible graph structure.

Figure 7:
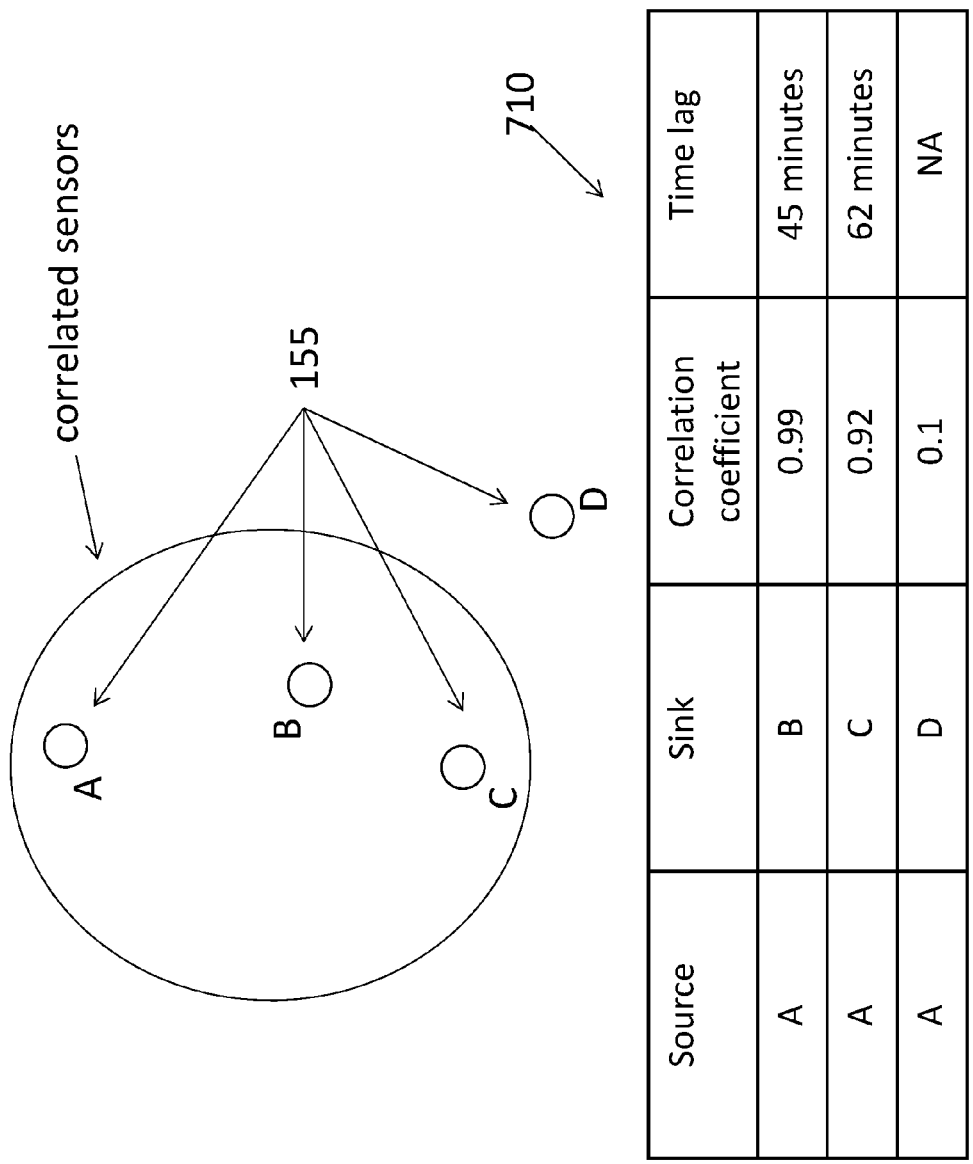
FIG. 7 shows an exemplary result of correlation according to embodiments
Figure 8:
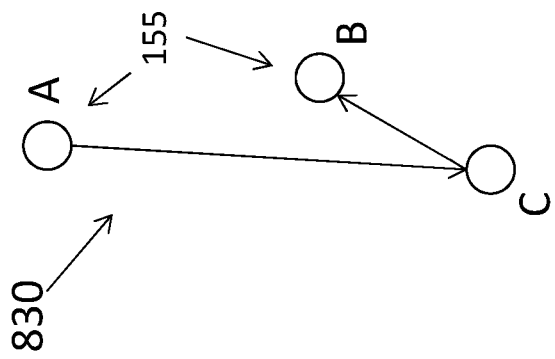
FIG. 8 shows exemplary graph structures based on the correlation according to embodiments.
Figure 8:
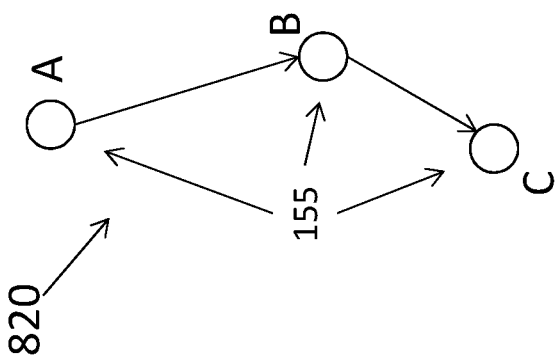
Figure 8:
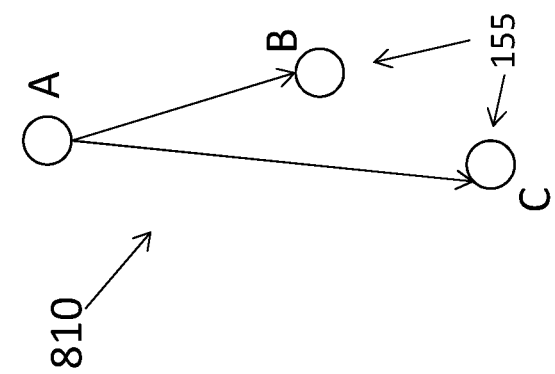

FIG. 7 shows an exemplary result of correlation (at block 240) according to embodiments. The exemplary threshold correlation coefficient may be 0.9. Based on correlation coefficient values shown in the corresponding table 710, sensors 155 B and C are identified as correlated sensors 155 with selected sensor 155 A, because their correlation coefficient values of 0.99 and 0.92, respectively, exceed the threshold value of 0.9. Sensor 155 D has a correlation coefficient value (0.1) that is below the threshold and is, thus, not included among correlated sensors 155. As such, an interconnection 160 between sensor 155 A and sensor 155 D is not part of the possible graph structure constructed at block 250. FIG. 8 shows exemplary graph structures based on the correlation according to embodiments. The time lag (shown in table 710) that is part of the tuple generated at block 240 is used to generate the graph structures at block 250. Because of time lag of 45 minutes to sensor 155 B and the time lag of 62 minutes to sensor 155 C, the graph structure 830 is discarded. That is, the pressure change cannot reach sensor 155 C before it reaches sensor 155 B, as indicated by the graph structure 830, because the time lag to sensor 155 C is longer than the time lag to sensor 155 B. Exemplary graph structures 810 and 820 are retained at block 250 for further consideration.

Figure 9:
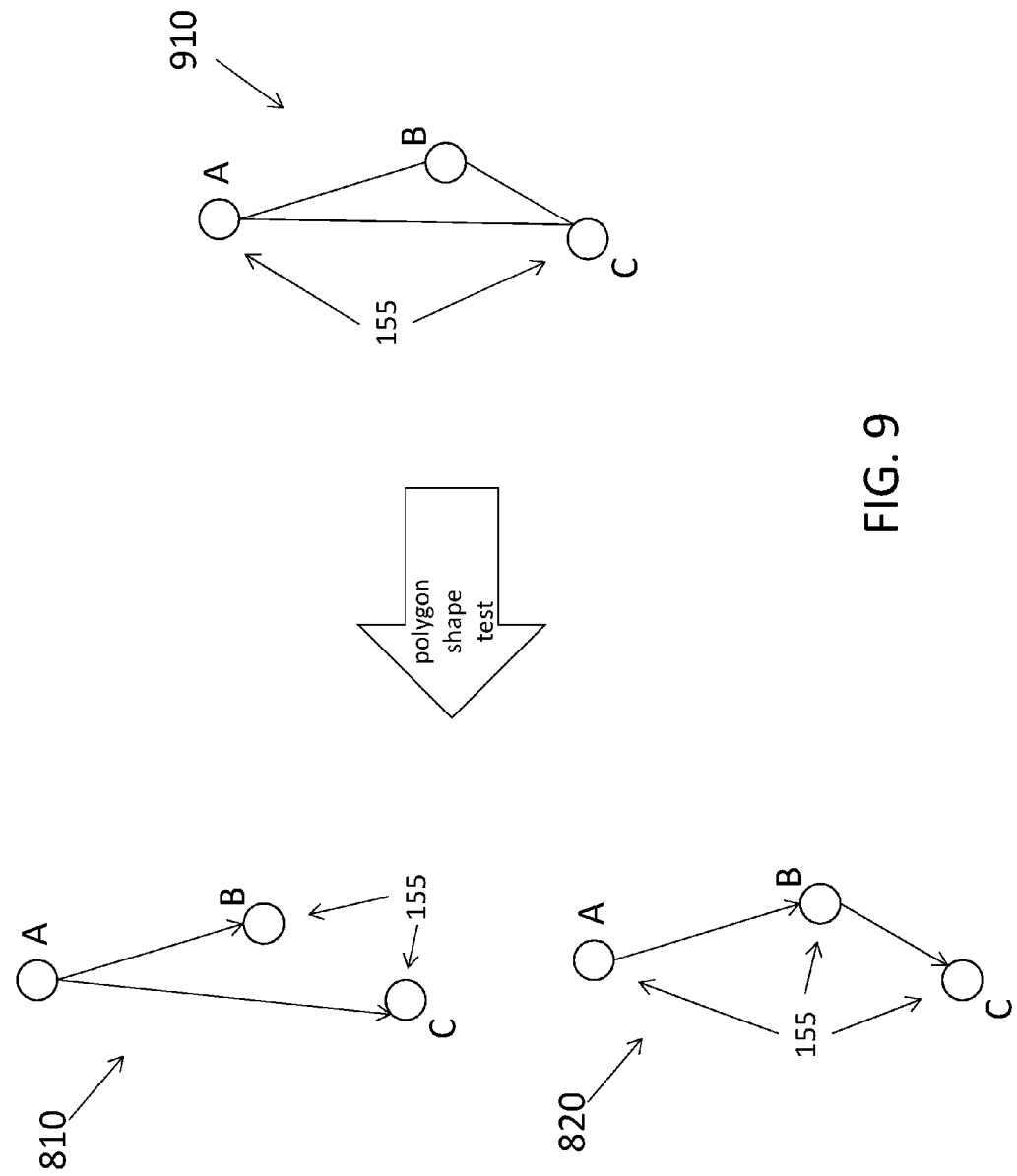
FIG. 9 shows a spatial placement of exemplary sensors according to an embodiment.
Figure 10:
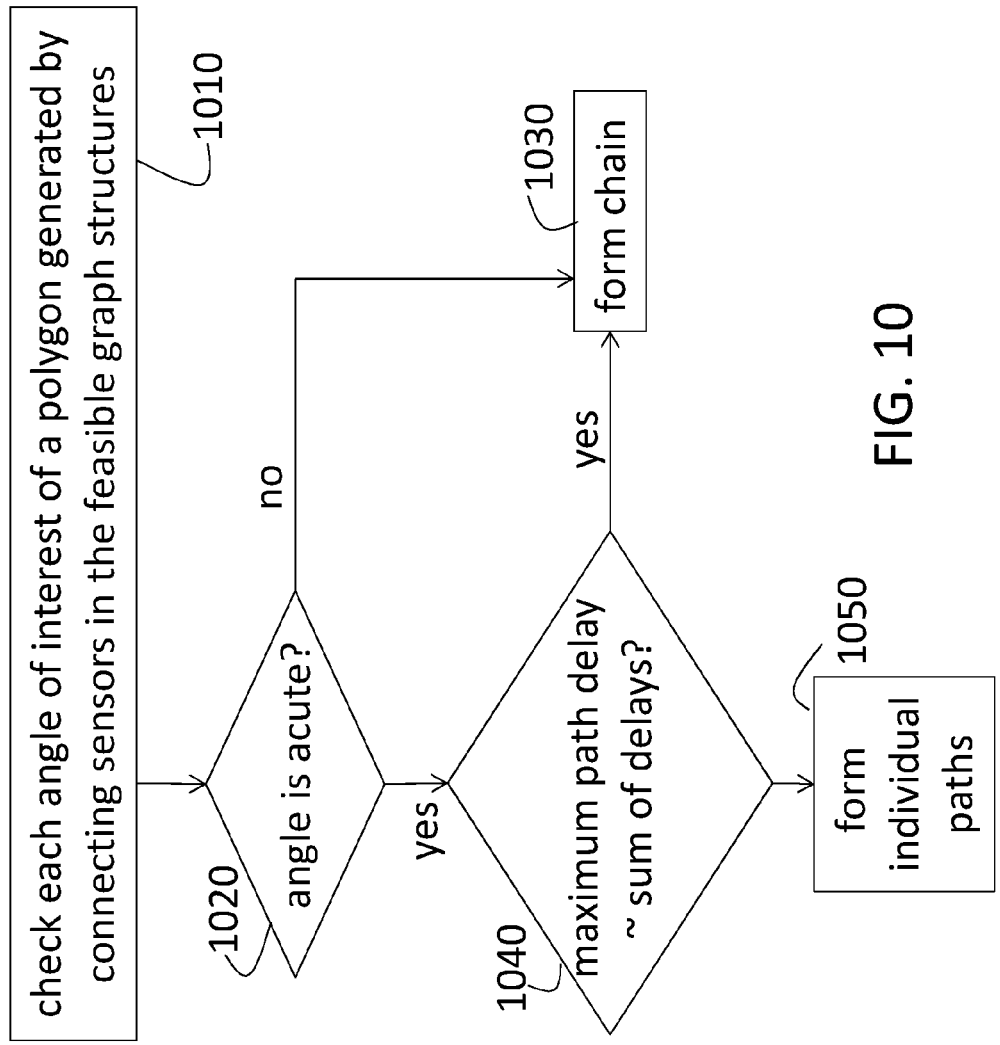
FIG. 10 is a flow diagram of a method of determining the feasible graph structure according to an embodiment.

Determining a feasible graph structure, at block 270, uses the possible graph structures (e.g., 810, 820) that are constructed at block 250 and the geopositions of the sensors 155 constructed at block 260. The spatial placement 910 of the sensors 155, based on the stored geoposition of the sensors 155, is shown in FIG. 9. A polygon shape test is applied to this spatial placement 910 to select among the possible graph structures 810 and 820. Specifically, the spatial placement 910 is examined to determine if an acute angle polygon or obtuse angle polygon is formed. FIG. 10 is a flow diagram of a method of determining the feasible graph structure (at block 270) according to an embodiment. At block 1010, checking each angle of interest a polygon generated by connecting sensors 155 in the feasible graph structures, in turn, refers to forming a polygon by connecting the selected sensor 155 (e.g., sensor 155 A) and the nearby sensors 155 (e.g., sensors 155 B and C) that are used to form feasible graph structures (e.g., 810, 820). In the exemplary case, a triangle would be formed, and the angle of interest would be at sensor 155 B. This is because sensor 155 B is where a decision has to be made about whether sensor 155 A connects to sensor 155 C through sensor 155 B or directly (i.e., sensor 155 B is the potential branch point). At block 1020, the processes include checking to see if an angle of interest is acute. If it is not (as is the exemplary case with the angle formed at sensor 155 B), then the angle must be obtuse or a right angle. In this case, forming a chain, at block 1030, means the sensor 155 at the angle of interest is part of a chain (e.g., from sensor 155 A to sensor 155 B to sensor 155 C). If the angle is acute (based on the check at block 1020), then a further check is done at block 1040. The check at block 1040 is to see if the maximum path delay (e.g., delay from sensor 155 A to sensor 155 C) is approximately equal to the sum of delays (e.g., sum of delay from sensor 155 A to sensor 155 B and delay from sensor 155 A to sensor 155 C). If so, then a chain is formed (at block 1030). That is, possible graph structure 820 is selected as the feasible graph structure. If not, then forming individual paths, at block 1050, results in possible graph structure 810 being selected as the feasible graph structure.

Figure 11:
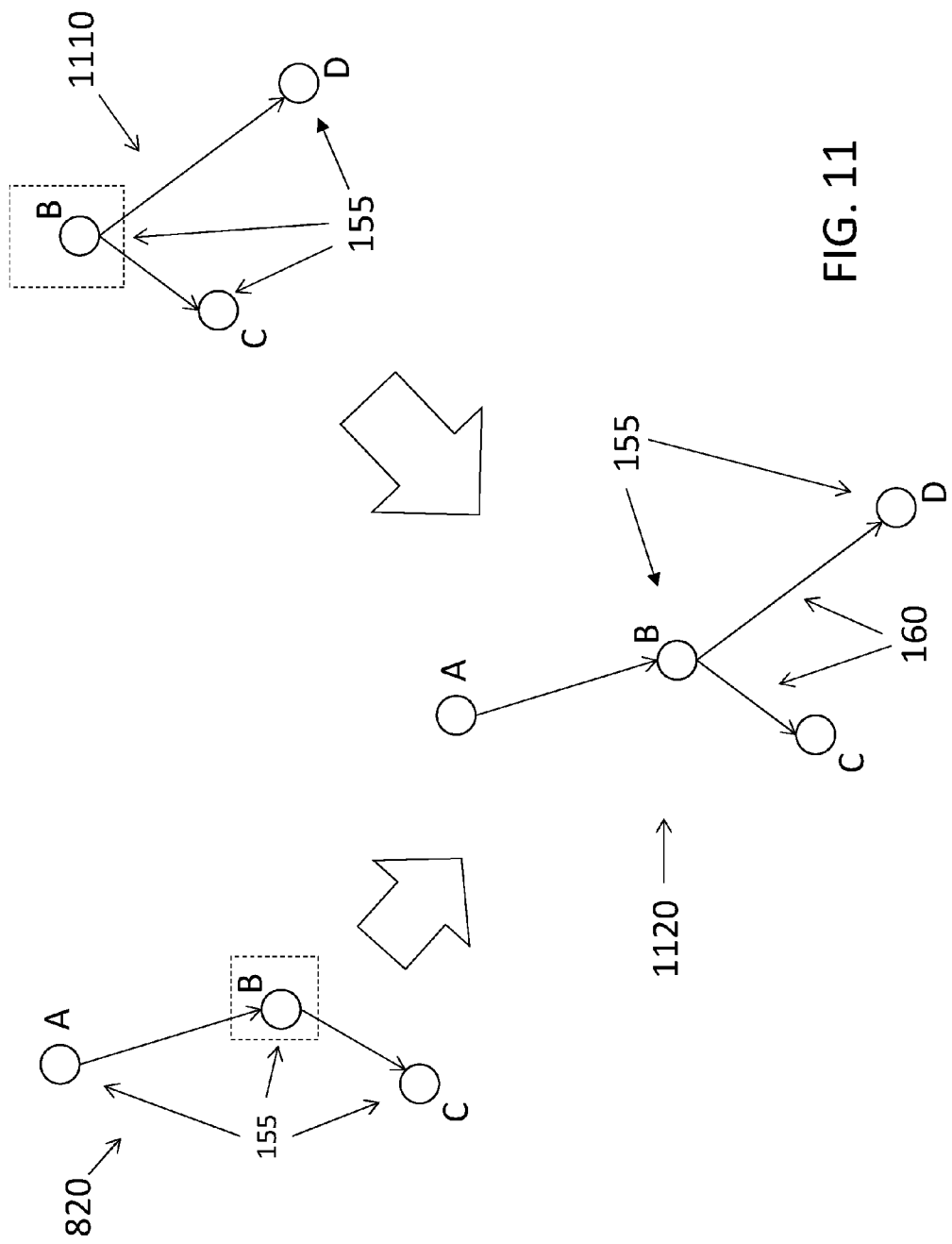
FIG. 11 shows the generation of an exemplary network graph representation according to an embodiment.

FIG. 11 shows the generation of an exemplary network graph representation 1120 according to an embodiment. FIG. 11 shows the feasible graph structure 820 determined at block 270 with sensor 155 A being the selected sensor 155. FIG. 11 also shows the feasible graph structure 1110 determined when sensor 155 B is the selected sensor 155 in a subsequent iteration, in which the processes 220-270 are repeated. These partial feasible graph structures 820, 1110 are merged to generate a network graph representation 1120, at block 280. The network graph representation 1120 of the physically connected network 150 may take into account all the sensors 155 of the physically connected network 150 or a portion of the complete physically connected network 150. That is, sensors 155 A, B, C, and D in the exemplary physically connected network 150 shown in FIG. 1 may be a subset of all the sensors 155 in the physically connected network 150.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of generating a network graph representation of a physically connected network, the method comprising:
   selecting a selected sensor among a plurality of sensors arranged along the physically connected network;
   searching, using a processor, a time-varying data signal from the selected sensor for measurement patterns;
   identifying, using the processor, candidate sensors among the plurality of sensors that are candidates for being directly connected with the selected sensor based on each of the candidate sensors outputting a respective candidate time-varying data signal with candidate patterns that match the measurement patterns of the time-varying data signal of the selected sensor;
   constructing possible graph sub-structures including the selected sensor and the candidate sensors;
   determining a feasible graph sub-structure based on the possible graph sub-structure and spatial placement of each of the selected sensor and the candidate sensors; and
   generating the network graph representation based on iteratively determining the feasible graph sub-structure based on selecting a different one of the plurality of sensors as the selected sensor.

2. The computer-implemented method according to claim 1, wherein the searching the time-varying data signal from the selected sensor for the measurement patterns includes using spectral analysis, histogram analysis, fast Fourier transform (FFT), or wavelet transformation on the time-varying data signal.

3. The computer-implemented method according to claim 1, wherein the identifying the candidate sensors includes identifying nearby sensors among the plurality of sensors to the selected sensor, the nearby sensors being identified based on a distance between each nearby sensor and the selected sensor according to geoposition information for the plurality of sensors.

4. The computer-implemented method according to claim 3, wherein the identifying the candidate sensors includes identifying which of the nearby sensors includes a respective candidate time-varying data signal with candidate patterns that match the measurement patterns of the time-varying data signal of the selected sensor and a time lag between the candidate time-varying data signal and the time-varying data signal of the selected sensor below a threshold time lag.

5. The computer-implemented method according to claim 4, wherein the identifying the candidate sensors includes determining a correlation coefficient based on each candidate time-varying data signal and the time-varying data signal of the selected sensor.

6. The computer-implemented method according to claim 5, wherein the correlation coefficient is computed as:

$$\rho_{X,Y} = \frac{\text{cov}(X, Y)}{\sigma_X \sigma_Y},$$

where

X and Y are the candidate time-varying data signal and the time-varying data signal of the selected sensor, respectively, cov refers to covariance, and $\sigma_X$ and $\sigma_Y$ are a standard deviation of the candidate time-varying data signal and the time-varying data signal of the selected sensor, respectively.

7. The computer-implemented method according to claim 1, wherein the determining the feasible graph sub-structure includes determining interconnections between the selected sensor and each of the candidate sensors.

8. The computer-implemented method according to claim 1, wherein the generating the network graph representation includes generating a graphical representation of a natural gas pipeline in which the plurality of sensors measure pressure.

9. A system to generate a network graph representation of a physically connected network, the system comprising:
a memory device configured to store geopositions of a plurality of sensors arranged along the physically connected network; and
a processor configured to select a selected sensor among the plurality of sensors, search a time-varying data signal from the selected sensor for measurement patterns, identify candidate sensors among the plurality of sensors that are candidates for being directly connected with the selected sensor based on each of the candidate sensors outputting a respective candidate time-varying data signal with candidate patterns that match the measurement patterns of the time-varying data signal of the selected sensor, construct possible graph sub-structures that include the selected sensor and the candidate sensors, determine a feasible graph sub-structure based on the possible graph sub-structure and spatial placement of each of the selected sensor and the candidate sensors, and generate the network graph representation based on iteratively determining the feasible graph sub-structure by selecting a different one of the plurality of sensors as the selected sensor.

10. The system according to claim 9, wherein the processor is configured to search the time-varying data signal from the selected sensor for measurement patterns by using spectral analysis, histogram analysis, fast Fourier transform (FFT), or wavelet transformation on the time-varying data signal.

11. The system according to claim 9, wherein the processor is configured to identify the candidate sensors based on identifying nearby sensors among the plurality of sensors to the selected sensor, the nearby sensors being identified based on a distance between each nearby sensor and the selected sensor according to geoposition information for the plurality of sensors, and identifying which of the nearby sensors includes a respective candidate time-varying data signal with candidate patterns that match the measurement patterns of the time-varying data signal of the selected sensor and a time lag between the candidate time-varying data signal and the time-varying data signal of the selected sensor below a threshold time lag.

12. The system according to claim 11, wherein the processor is configured to identify the candidate sensors based additionally on determining a correlation coefficient based on each candidate time-varying data signal and the time-varying data signal of the selected sensor, the correlation coefficient being computed as:

$$\rho_{X,Y} = \frac{\text{cov}(X, Y)}{\sigma_X \sigma_Y},$$

where

X and Y are the candidate time-varying data signal and the time-varying data signal of the selected sensor, respectively, cov refers to covariance, and $\sigma_X$ and $\sigma_Y$ are a standard deviation of the candidate time-varying data signal and the time-varying data signal of the selected sensor, respectively.

13. The system according to claim 9, wherein the processor is configured to determine the feasible graph sub-structure based on determining interconnections between the selected sensor and each of the candidate sensors.

14. The system according to claim 9, wherein the network graph representation is of a natural gas pipeline, and the plurality of sensors are configured to measure pressure.

15. A computer program product for generating a network graph representation of a physically connected network, the computer program product comprising a computer readable storage medium having program instructions embodied therewith, the program instructions executable by a processor to perform a method comprising:
selecting a selected sensor among a plurality of sensors arranged along the physically connected network;
searching a time-varying data signal from the selected sensor for measurement patterns;
identifying candidate sensors among the plurality of sensors that are candidates for being directly connected with the selected sensor based on each of the candidate sensors outputting a respective candidate time-varying data signal with candidate patterns that match the measurement patterns of the time-varying data signal of the selected sensor;
constructing possible graph sub-structures including the selected sensor and the candidate sensors;
determining a feasible graph sub-structure based on the possible graph sub-structure and spatial placement of each of the selected sensor and the candidate sensors; and
generating the network graph representation based on iteratively determining the feasible graph sub-structure based on selecting a different one of the plurality of sensors as the selected sensor.

16. The computer program product according to claim 15, wherein the searching the time-varying data signal from the selected sensor for the measurement patterns includes using spectral analysis, histogram analysis, fast Fourier transform (FFT), or wavelet transformation on the time-varying data signal.

17. The computer program product according to claim 15, wherein the identifying the candidate sensors includes identifying nearby sensors among the plurality of sensors to the selected sensor, the nearby sensors being identified based on a distance between each nearby sensor and the selected sensor according to geoposition information for the plurality of sensors, and identifying which of the nearby sensors includes a respective candidate time-varying data signal with candidate patterns that match the measurement patterns of the time-varying data signal of the selected sensor and a time lag between the candidate time-varying data signal and the time-varying data signal of the selected sensor below a threshold time lag.

18. The computer program product according to claim 17, wherein the identifying the candidate sensors includes determining a correlation coefficient based on each candidate time-varying data signal and the time-varying data signal of the selected sensor, the correlation coefficient being computed as:

$$\rho_{X,Y} = \frac{\text{cov}(X, Y)}{\sigma_X \sigma_Y},$$

where
X and Y are the candidate time-varying data signal and the time-varying data signal of the selected sensor, respectively, cov refers to covariance, and $\sigma_X$ and $\sigma_Y$ are a standard deviation of the candidate time-varying data signal and the time-varying data signal of the selected sensor, respectively.

19. The computer program product according to claim 15, wherein the determining the feasible graph sub-structure includes determining interconnections between the selected sensor and each of the candidate sensors.

20. The computer program product according to claim 15, wherein the generating the network graph representation includes generating a graphical representation of a natural gas pipeline in which the plurality of sensors measure pressure.

* * * * *